(12) United States Patent
Suzuki (10) Patent No.: US 7,902,911 B2
(45) Date of Patent: Mar. 8, 2011

(54) BOOSTER CIRCUIT (75) Inventor: Atsushi Suzuki, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 59 days.

(21) Appl. No.: 12/483,702

(22) Filed: Jun. 12, 2009

(65) Prior Publication Data
US 2009/0309651 A1 Dec. 17, 2009

(30) Foreign Application Priority Data

Jun. 16, 2008 (JP) ................. 2008-156913

(51) Int. Cl.
G05F 1/10 (2006.01)
G05F 3/02 (2006.01)
(52) U.S. Cl. ....................................... 327/536
(58) Field of Classification Search ................. 327/536; 363/59–60
See application file for complete search history.

(56) References Cited

U.S. PATENT DOCUMENTS

| 2001/0017565 A1* | 8/2001 | Zanuccoli et al. | 327/536 |
| 2008/0079480 A1* | 4/2008 | Utsunomiya | 327/536 |
| 2009/0134936 A1* | 5/2009 | Chang et al. | 327/536 |
| 2009/0184753 A1* | 7/2009 | Kawashima et al. | 327/536 |

FOREIGN PATENT DOCUMENTS

| JP | 2002-218740 | 8/2002 |
| JP | 2003-250263 | 9/2003 |
| JP | 2004-304285 | 10/2005 |
| JP | 2007-267537 | 10/2007 |

* cited by examiner

Primary Examiner — Quan Tra
(74) Attorney, Agent, or Firm — Oblon, Spivak, McClelland, Maier & Neustadt, L.L.P.

(57) ABSTRACT

A booster circuit includes a first booster unit configured to boost a power supply voltage to a predetermined voltage value, a transfer gate transistor transferring the voltage received from the first booster unit to an output terminal, a switching transistor connected between an input terminal receiving the voltage from the first booster unit and a gate electrode of the transfer gate transistor, and a second booster unit configured to boost a voltage applied to a gate electrode of the switching transistor. The second booster unit includes an NMOS booster transistor. A drain electrode of the booster transistor is connected to the output terminal, a source terminal of the booster transistor is connected to a terminal to which a boosted voltage is to be applied, and a gate electrode of the booster transistor is connected to a booster capacitor.

20 Claims, 6 Drawing Sheets

BOOSTER CIRCUIT

CROSS-REFERENCE TO RELATED APPLICATIONS

This application is based upon and claims the benefit of priority from the prior Japanese Patent Application No. 2008-156913, filed Jun. 16, 2008, the entire contents of which are incorporated herein by reference.

BACKGROUND OF THE INVENTION

1. Field of the Invention

The present invention relates to a booster circuit which generates a high voltage, and which is used for a driver IC, a non-volatile semiconductor memory, a semiconductor integrated circuit and the like.

2. Description of the Related Art

Conventional booster circuits may be categorized into two types: one using a coil, and the other using a capacitor element. The booster circuit using a capacitor element is generally termed a "charge pump". In a conventional booster circuit, a large capacitor for boosting an output voltage is connected to a node $V_{OUT}$, and an NMOS transistor, termed a transfer gate transistor, is inserted between a node $V_{IN}$ and the node $V_{OUT}$, where $V_{IN}$ denotes an input voltage and $V_{OUT}$ denotes an output voltage. As a result, the node $V_{IN}$ and the node $V_{OUT}$ are separated from each other by the transfer gate transistor.

One electrode of a capacitor for boosting a gate voltage is connected to a gate electrode of the transfer gate transistor. The other electrode of the capacitor for boosting a gate voltage is connected to a clock terminal. Thereby, an appropriate clock signal is inputted to the electrode.

A switching transistor is connected between the node $V_{IN}$ and the gate electrode of the transfer gate transistor. Consequently, while the switching transistor is turned on, the potential of the gate electrode of the transfer gate transistor and the potential of the node $V_{IN}$ are equal to each other.

To reduce a leakage current in the booster circuit, a high-threshold NMOS transistor is used as the transfer gate transistor. In addition, a substrate bias effect caused by a boosted voltage further raises the threshold of the transfer gate transistor.

A high voltage needs to be applied to the gate electrode of the transfer gate transistor in order to operate such a high-threshold transfer gate transistor. For raising a voltage applied to a node (hereinafter referred to as "node A") to which the gate electrode of the transfer gate transistor is connected, it is necessary to raise a voltage applied to a node (hereinafter referred to as "node B") to which the gate electrode of the switching transistor is connected.

The voltage $V_{OUT}$ outputted from the booster circuit depends on a power supply voltage $V_{DD}$, the temperature, and dispersion among the thresholds of the respective transistors used in the booster circuit. Nevertheless, the booster circuit needs to output a voltage at a required level under any conditions. Specifically, a high voltage needs to be applied to each of the nodes A and B in order to turn on the transfer gate transistor even under conditions in which the power supply voltage $V_{DD}$ is low, the temperature is low, and the thresholds of the respective transistors used in the circuit are high.

However, in such a conventional circuit as described above, an excessively high voltage may possibly be applied to the node B in the case where the power supply voltage $V_{DD}$ is high, where the temperature is high, and where the thresholds of the respective transistors used in the circuit are low. Depending on the breakdown voltage limits of junctions respectively in the transfer gate transistor and the switching transistor, such an excessively high voltage might cause a problem that any of the transistors malfunctions and/or a problem that junction leakage occurs therein.

SUMMARY OF THE INVENTION

A booster circuit according to an aspect of the present invention is characterized by including: a first booster unit configured to boost a power supply voltage to a predetermined voltage value, an input terminal receiving a voltage from the first booster unit, a transfer gate transistor transferring the voltage received from the first booster unit to a first output terminal, a switching transistor connected between the input terminal and a gate electrode of the transfer gate transistor, and a second booster unit configured to boost a voltage applied to a gate electrode of the switching transistor, wherein the second booster unit includes a booster transistor, a drain electrode of the booster transistor is connected to the first output terminal, a source electrode of the booster transistor is connected to the gate electrode of the switching transistor, and a gate electrode of the booster transistor is connected to a booster capacitor.

A semiconductor device according to an another aspect of the present invention is characterized by including: a booster circuit that boosts a power supply voltage to provide a predetermined voltage, and a limiter circuit for controlling a voltage received from the booster circuit, wherein the booster circuit includes a first booster unit that boosts a power supply voltage to a predetermined voltage, an input terminal for receiving a voltage output by the first booster unit, a transfer gate transistor that transfers the voltage received from the first booster unit to a first output terminal, a switching transistor connected between the input terminal and a gate electrode of the transfer gate transistor, and a second booster unit that boosts a voltage applied to a gate electrode of the switching transistor, the second booster unit including a booster transistor having a drain electrode connected to the first output terminal, a source electrode connected to gate electrode of the switching transistor, and a gate electrode connected to a booster capacitor.

BRIEF DESCRIPTIONS OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 is a circuit diagram for explaining an internal configuration of a booster cell 1a.

DETAILED DESCRIPTION OF THE PREFERRED EMBODIMENT

Various other objects, features and attendant advantages of the present invention will be more fully appreciated from the following detailed description when considered in connection with the accompanying drawings in which like reference characters designate like or corresponding parts throughout the several views.

Figure 1:
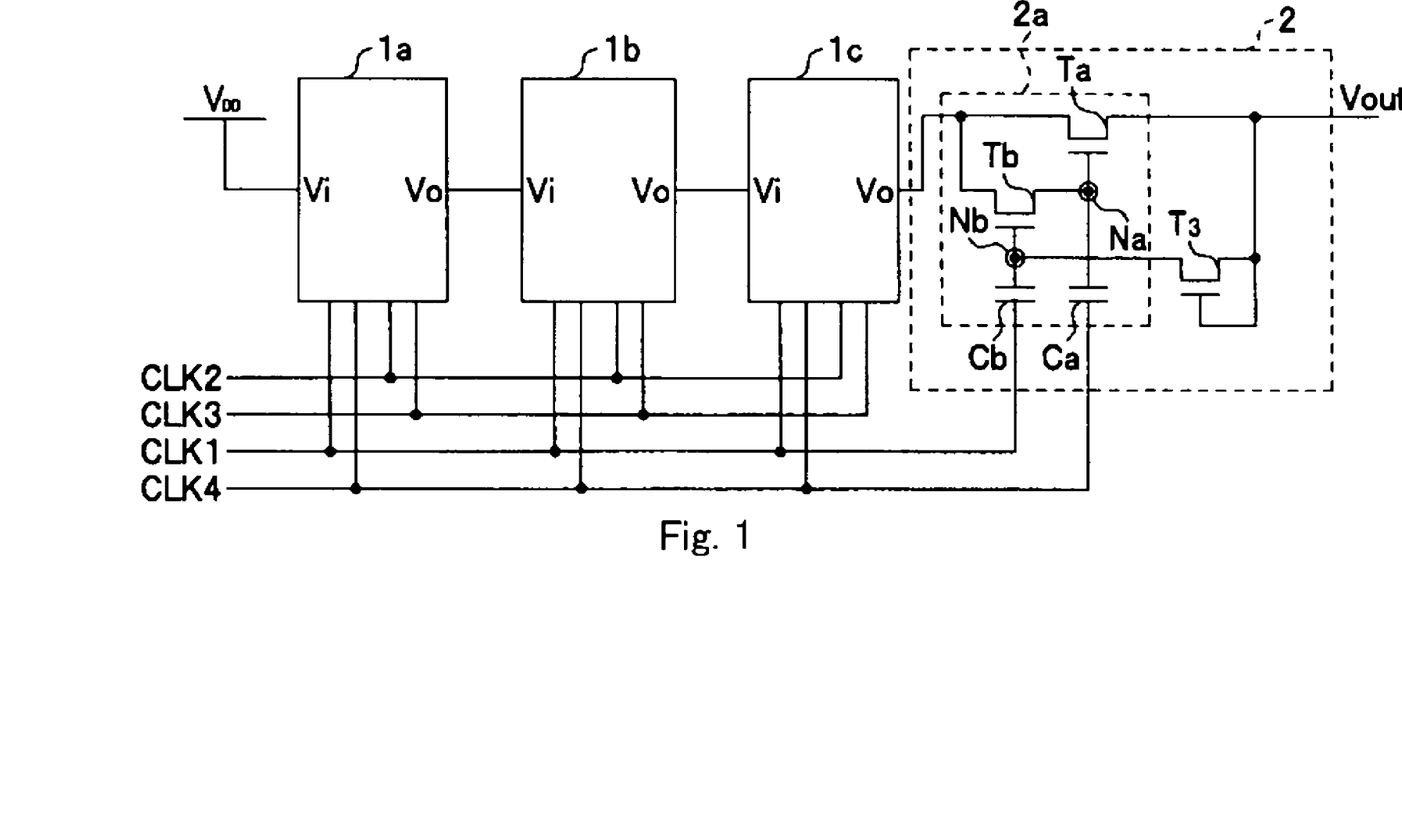
FIG. 1 is a block diagram for explaining a configuration of a booster circuit.

First of all, descriptions will be provided for a configuration of a booster circuit constituting a basis for the embodiment of the present invention by use of FIG. 1. FIG. 1 is a block diagram for explaining the configuration of the booster circuit.

The booster circuit shown in FIG. 1 is a booster circuit driven by four clock signals having different phases. The booster circuit is configured so that three booster cells 1a, 1b and 1c constituting a first booster unit and a booster circuit 2 are connected one after another in series. Although not illustrated, a rectifier transistor and a limiter circuit are connected to an output side of the booster circuit 2. A boosted output voltage $V_{OUT}$ with a certain value is outputted from the booster circuit 2 through the rectifier transistor and the limiter circuit. Note that the number of booster cells constituting the booster circuit is not necessarily limited to 3. The booster circuit may include four or more booster cells which are connected one after another in series. Instead, the booster circuit may include one booster cell only.

Figure 2:
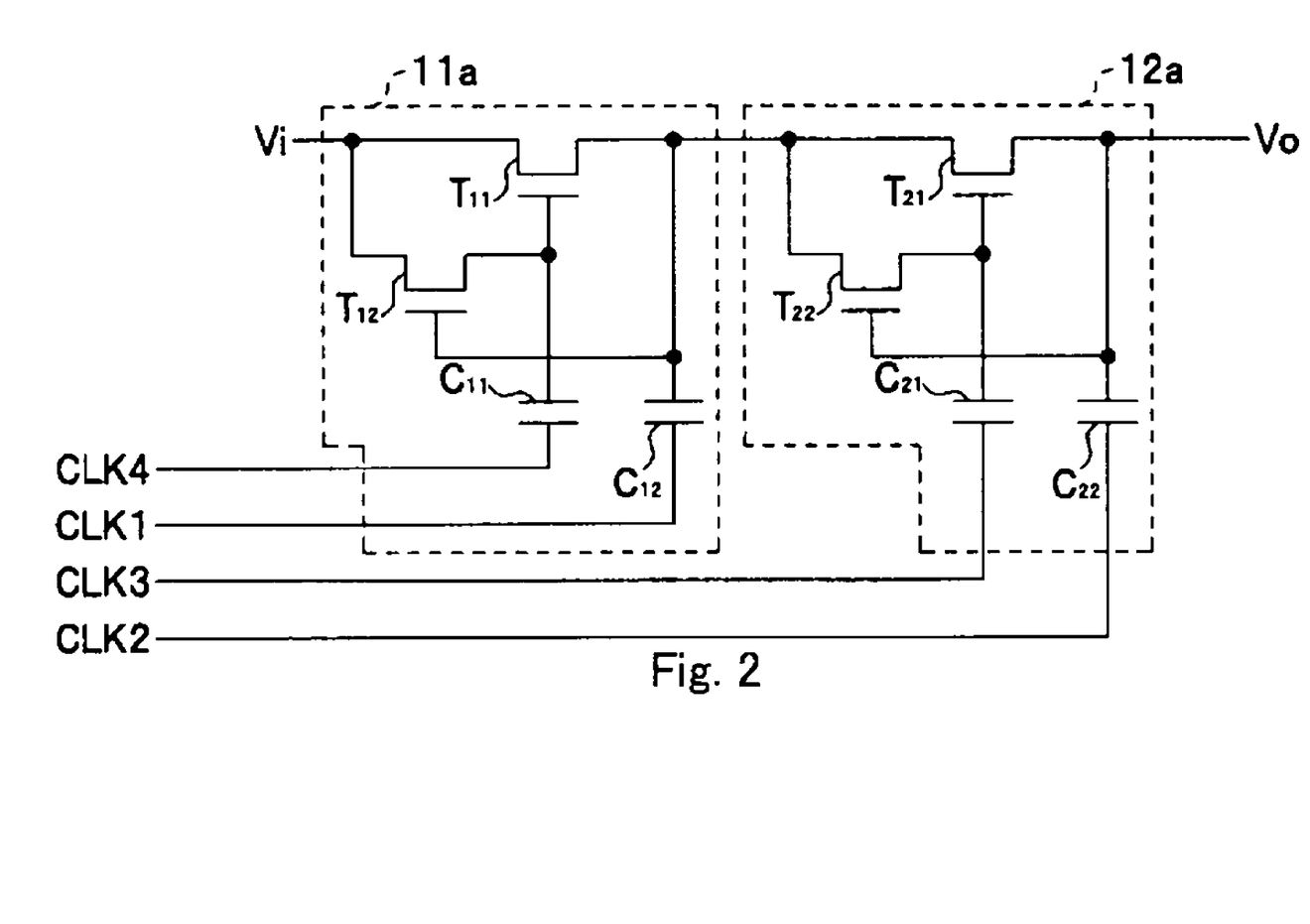

The booster cells 1a to 1c have the same configuration. For this reason, the description is exemplary made on an internal configuration of the booster cell 1a in FIG. 2. FIG. 2 is a circuit diagram for explaining the internal configuration of the booster cell 1a. As shown in FIG. 2, the booster cell 1a includes two booster circuits 11a and 12a which have the same configuration. Note that the booster circuit 11a is driven by two clock signals CLK1 and CLK4, whereas the booster circuit 12a is driven by two clock signals CLK2 and CLK3 whose phases are different from those of the two clock signals CLK1 and CLK4.

The booster circuit 11a includes: an NMOS transfer gate transistor $T_{11}$; an NMOS switching transistor $T_{12}$; a capacitor $C_{11}$ for boosting a gate voltage; and a boot capacitor $C_{12}$ for boosting an output voltage.

The transfer gate transistor $T_{11}$ transfers to the subsequent booster circuit 12a an input voltage Vi inputted into the booster circuit 11a. The switching transistor $T_{12}$ is connected to the gate electrode of the transfer gate transistor $T_{11}$ and the input terminal of the booster circuit 11a. Consequently, while the switching transistor $T_{12}$ is turned on, the switching transistor $T_{12}$ equalizes the gate voltage of the transfer gate transistor $T_{11}$ to the voltage of the input terminal of the booster circuit 11a.

One electrode of the capacitor $C_{11}$ for boosting the gate voltage is connected to the gate electrode of the transfer gate transistor $T_{11}$. The other electrode of the capacitor $C_{11}$ for boosting the gate voltage is connected to an unillustrated clock terminal. Consequently, the clock signal CLK4 is inputted into the capacitor $C_{11}$ for boosting the gate voltage. One electrode of the boot capacitor $C_{12}$ is connected to the output side (the drain electrode) of the transfer gate transistor $T_{11}$. The other electrode of the boot capacitor $C_{12}$ is connected to another unillustrated clock terminal. Consequently, the clock signal CLK1 is inputted into the boot capacitor $C_{12}$.

Figure 3:
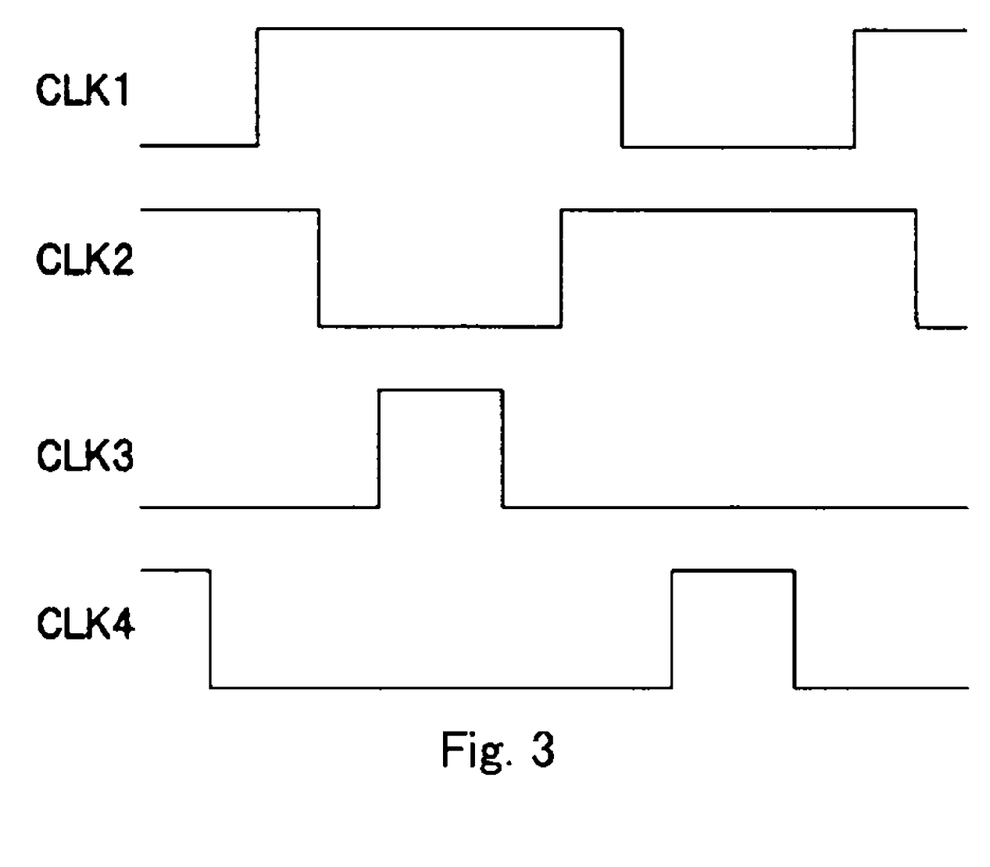
FIG. 3 is a timing chart of clock signals for driving the booster circuit.

The clock signals CLK1 to CLK4 inputted into the booster cell 1a respectively have square waves each having predetermined "H" periods, predetermined "L" periods and predetermined cycles. FIG. 3 is a timing chart of an example of the clock signals which drive the booster circuit.

Subsequently, descriptions will be provided for an internal configuration of the booster circuit 2 by use of FIG. 1. The booster circuit 2 receives a boosted voltage from the booster cell 1c, and outputs a voltage $V_{OUT}$. The booster circuit 2 includes a voltage output circuit 2a and a transistor $T_3$.

The voltage output circuit 2a includes a transfer gate transistor Ta, a switching transistor Tb, a capacitor Ca for boosting a gate voltage, and a boot capacitor Cb for boosting a gate voltage to be applied to the transistor Tb for pre-charging a gate voltage to be applied to the transistor Ta. The connection among the transistors and capacitors of the voltage output circuit 2a is the same as that of the booster circuit 11a in the booster cell 1a, which has been described above in FIG. 2.

The transistor $T_3$ is connected between the gate electrode of the transistor Tb and the output terminal of the booster circuit 2. In addition, the gate electrode and drain electrode (the output terminal of the booster circuit 2) of the transistor $T_3$ are connected to each other. The transistor $T_3$ pulls the voltage $V_{OUT}$, applied to the output terminal of the booster circuit 2, into the gate electrode of the transistor Tb. Thus, the voltage $V_{OUT}$ is applied to a node Nb that is a node to which the gate electrode of the switching transistor Tb is connected.

Figure 4A:
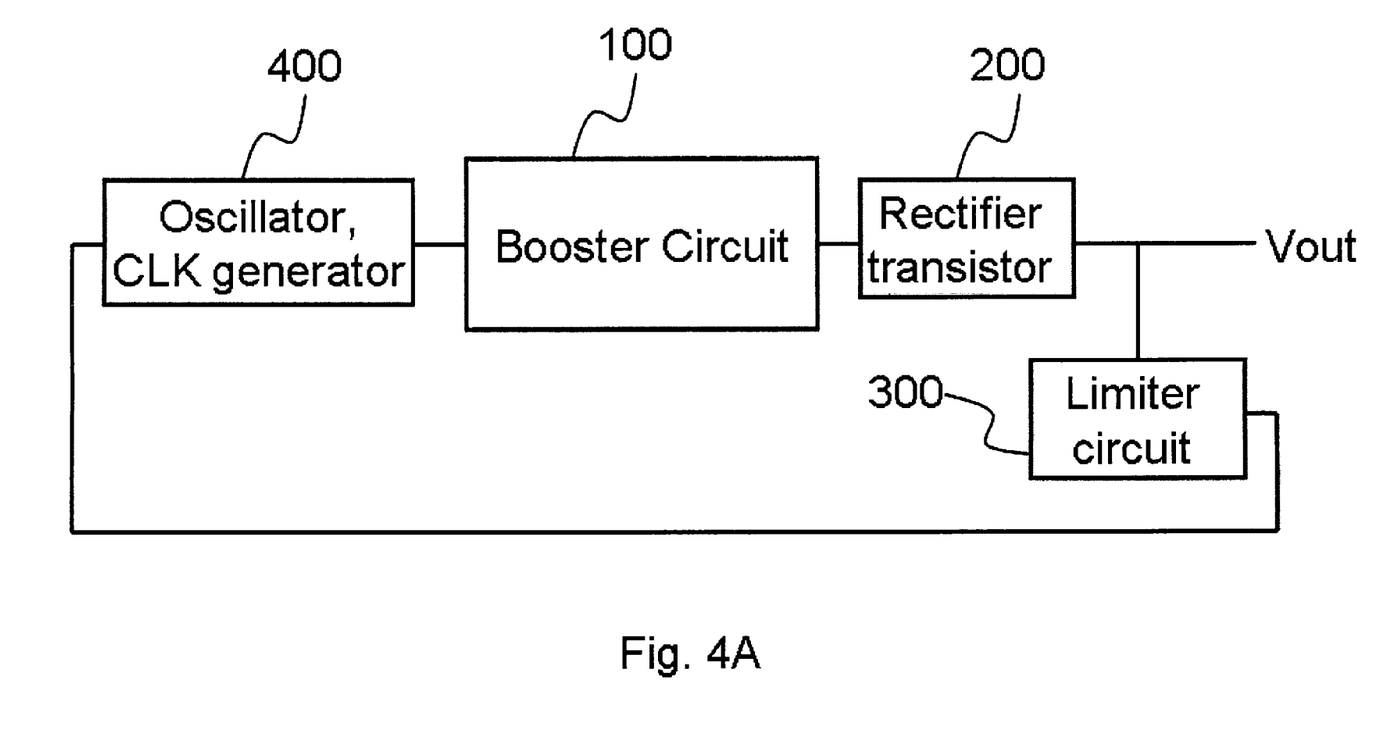
FIG. 4A is a block diagram for explaining another configuration of the semiconductor device.
Figure 4B:
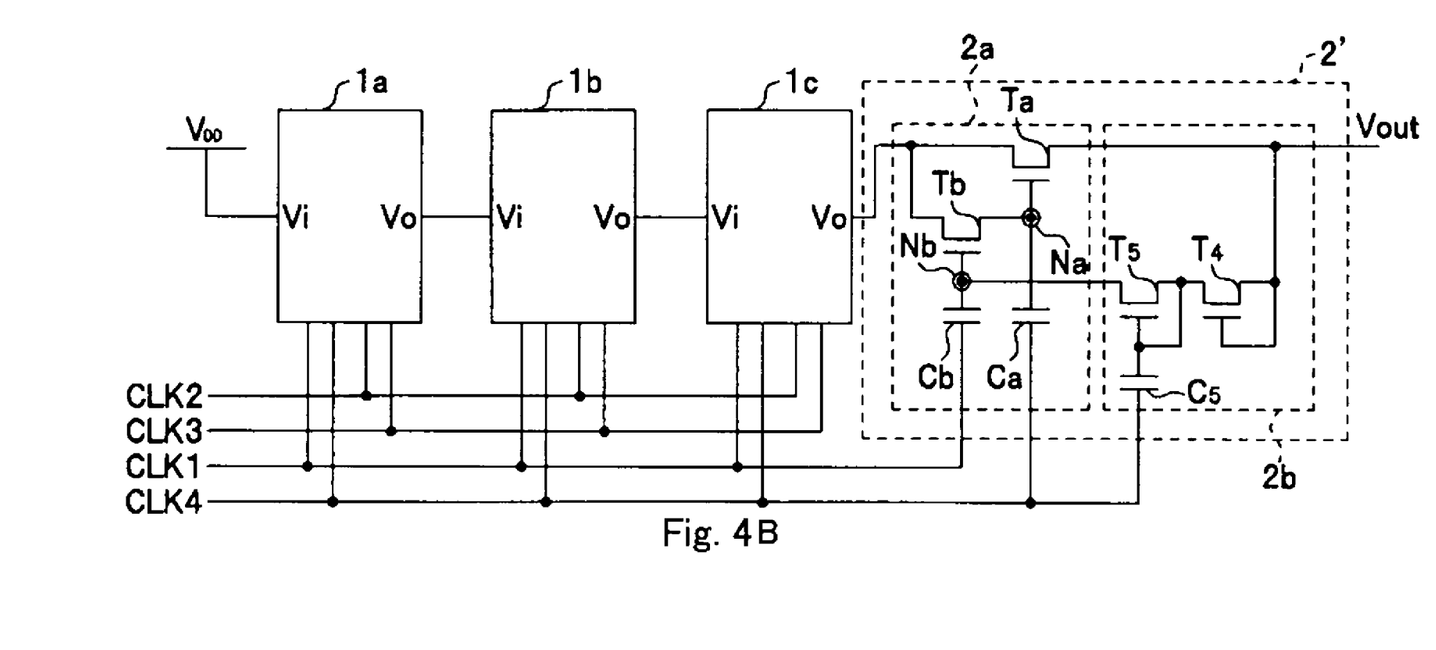
FIG. 4B is a block diagram for explaining another configuration of the booster circuit.

A booster circuit shown in FIG. 4 is conceivable as a circuit for further boosting the voltage to be applied to the node Nb. FIG. 4A and FIG. 4B is a block diagram for explaining another configuration of the booster circuit. As shown in FIG. 4A, the semiconductor device has booster circuit 100, rectifier transistor 200 and limiter circuit 300, oscillator/clock generator 400. Rectifier transistor 200 and limiter circuit 300 are connected to an output side of booster circuit 100. Boosted output voltage $V_{OUT}$ with a certain value is outputted from booster circuit 100 through rectifier transistor 200 and limiter circuit 300. Limiter circuit controls oscillator and clock generator so that output voltage $V_{OUT}$ has a constant value.

The booster circuit shown in FIG. 4B is different from the booster circuit shown in FIG. 1 in that the booster circuit shown in FIG. 4 additionally includes a gate voltage boosting circuit 2b as a second booster unit in order to further boost the voltage to be applied to the node Nb. The gate voltage boosting circuit 2b includes a capacitor $C_5$ and transistors $T_4$ and $T_5$ as booster transistors.

Specifically, NMOS transistors $T_4$ and $T_5$ for boosting voltages are inserted between the output terminal of a booster circuit 2' and the node Nb. One electrode of a capacitor $C_5$ for boosting a gate voltage is connected to the gate electrode of the booster transistor $T_5$ in the same manner as the gate electrode of the transfer gate transistor Ta. The other electrode of capacitor $C_5$ is connected to an unillustrated clock terminal CLK4. The capacitor $C_5$ receives the same clock signal as the capacitor Ca for boosting the voltage of the gate of the transfer gate transistor Ta receives. In addition, the gate electrode of the booster transistor $T_4$ and the drain electrode (the output terminal of the booster circuit 2') are connected to each other.

In sum, the voltage applied to the node Nb is boosted further by inserting the gate voltage boosting circuit 2b between the output terminal of the booster circuit 2' and the node Nb. Here the gate voltage boosting circuit 2b includes the booster transistors $T_4$ and $T_5$ and the capacitor $C_5$ for boosting a gate voltage. Note that, if multiple booster transistors connected one after another in series are inserted between the output terminal of the booster circuit 2' and the node Nb in the above circuit, it is possible to yet further boost the voltage value at the node Nb.

In a case where a voltage applied to the node Nb is boosted by two booster transistors which, as shown in FIG. 4, are inserted between the node of $V_{OUT}$ and the node Nb, the voltage $V_{Nb}$ can be expressed $V_{Nb} = V_{OUT} + 2*V_{DD} - 2*V_{th-n1}$    Equation 1, where $V_{Nb}$ denotes the boosted voltage at the node Nb, $V_{DD}$ denotes the power supply voltage, and $V_{th-n1}$ denotes the threshold of each of the booster transistors.

Specifically, the booster circuit shown in FIG. 4 is capable of boosting the voltage applied to the node Nb higher than the booster circuit shown in FIG. 1 by a value ($V_{DD}-V_{th-n1}$) of half the sum of the second and third terms in the right side of Equation 1.

Figure 5:
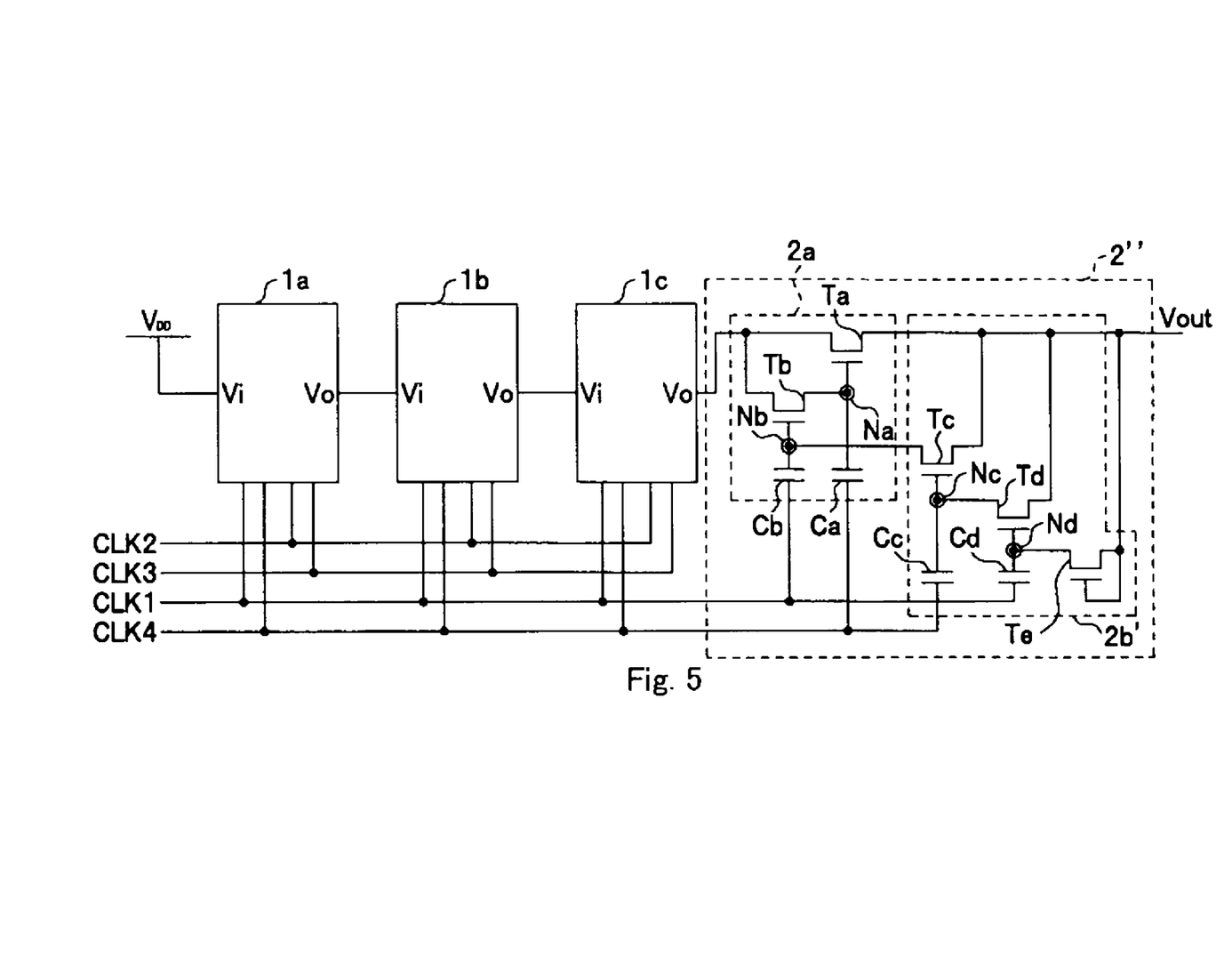
FIG. 5 is a block diagram for explaining a configuration of a booster circuit according to an embodiment of the present invention.

A booster circuit shown in FIG. 5 is conceivable as a booster circuit according to the embodiment of the present invention, which is obtained by further improving the booster circuit shown in FIG. 4. FIG. 5 is a block diagram for explaining a configuration of the booster circuit according to the embodiment of the present invention.

The booster circuit shown in FIG. 5 is different from the booster circuit shown in FIG. 4 in that the gate voltage boosting circuit 2b' serving as the second booster unit has a circuit configuration which is improved to stabilize a voltage applied to the Node Nb. The booster circuit shown in FIG. 5 is the same as those in FIG. 1 and FIG. 4 in the following points: the configuration of each of the three booster cells 1a to 1c constituting the first booster unit in the booster circuit described with reference to FIG. 2; the configuration of the voltage output circuit 2a constituting a booster circuit 2"; and the timings of the clock signals, which drive the booster circuit, shown in FIG. 3. For these reasons, descriptions for the same components are omitted. Descriptions will be hereinbelow provided only for the circuit configuration of the gate voltage boosting circuit 2b'.

The gate voltage boosting circuit 2b' includes: transistors Tc, Td and Te as booster transistors; and capacitors Cc and Cd. The transistor Tc is connected between the gate electrode of the switching transistor Tb and the output terminal of the booster circuit 2. One electrode of the capacitor Cc is connected to the gate electrode of the transistor Tc. The other electrode of the capacitor Cc is connected to an unillustrated clock terminal. Thus, the clock signal CLK4 is inputted into the capacitor Cc.

The transistor Td is connected between the gate electrode of the transistor Tc and the output terminal of the booster circuit 2. One electrode of the capacitor Cd is connected to the gate electrode of the transistor Td. The other electrode of the capacitor Cd is connected to an unillustrated clock terminal. Thus, the clock signal CLK1 is inputted into the capacitor Cd.

Additionally, the transistor Te is connected between the gate electrode of the transistor Td and the output terminal of the booster circuit 2". In addition, the gate and drain electrodes of the transistor Te are connected to each other.

In the booster circuit 2" configured in the above-described manner, descriptions will be provided for a voltage applied to the gate electrode of the switching transistor Tb. The voltage applied to the node Nb is generated by the gate voltage boosting circuit 2b'.

In the gate voltage boosting circuit 2b', descriptions will be provided for boosted voltages applied to the nodes Nc and Nd. In this respect, Nc denotes a node to which the gate electrode of the transistor Tc is connected, and Nd denotes a node to which the gate electrode of the transistor Td is connected. In addition, the thresholds of the respective transistors Tc to Te in the gate voltage boosting circuit 2b' are assumed to be all equal (to be $V_{th}$).

A boosted voltage $V_{Nd}$ applied to the node Nd takes a value obtained by adding a voltage drop across the transistor Te and a voltage boost caused by the capacitor Cd to the voltage $V_{OUT}$ of the output terminal of the voltage booster circuit 2", which is pulled into the node Nd via the transistor Te. In short, the boosted voltage $V_{Nd}$ applied to the node Nd can be expressed as $$V_{Nd}=V_{OUT}+V_{DD}-V_{th} \qquad \text{Equation 2.}$$

Next, a boosted voltage $V_{Nc}$ applied to the node Nc is considered. The boosted voltage $V_{Nc}$ varies depending on a value of a voltage applied to the gate electrode of the transistor Td. Specifically, when a voltage applied to the gate electrode of the transistor Td is lower than $V_{OUT}+V_{th}$, a voltage outputted to the source electrode of the transistor Td takes a value ($V_{OUT}+V_{DD}-2*V_{th}$) obtained by adding a voltage drop across the transistor Td to the voltage applied to the gate electrode of the transistor Td.

On the other hand, when the voltage applied to the gate electrode of the transistor Td is not less than $V_{OUT}+V_{th}$, a voltage outputted to the source electrode of the transistor Td takes a value equal to the voltage $V_{OUT}$ of the output terminal of the booster circuit 2", which is pulled into the transistor Td from its drain electrode. Consequently, the boosted voltage $V_{Nc}$ applied to the node Nc is obtained by adding a voltage boost caused by the capacitor Cc to the voltage pulled in the node Nc from the source electrode of the transistor Td. In sum, the boosted voltage $V_{Nc}$ applied to the node Nc can be expressed as $$V_{Nc}=\min(V_{OUT}+V_{DD}-2*V_{th},V_{OUT})+V_{DD} \qquad \text{Equation 3,}$$

where min (A, B) means comparing A and B, and choosing the smaller one. The same notation which will be used in the following equation also have that meaning.

Next, a boosted voltage $V_{Nd}$ applied to the node Nd is considered. The boosted voltage $V_{Nd}$ varies depending on a value of a voltage applied to the gate electrode of the transistor Tc (like the voltage $V_{Nc}$ applied to the node Nc). Specifically, when the voltage applied to the gate electrode of the transistor Tc is lower than $V_{OUT}+V_{th}$, a voltage outputted to the source electrode of the transistor Tc takes a value ($V_{OUT}+2*V_{DD}-3*V_{th}$) obtained by adding a voltage drop across the transistor Tc to the voltage applied to the gate electrode of the transistor Tc.

On the other hand, when the voltage applied to the gate electrode of the transistor Tc is not less than $V_{OUT}+V_{th}$, a voltage outputted to the source electrode of the transistor Tc takes a value equal to the voltage $V_{OUT}$ of the output terminal of the booster circuit 2", which is pulled into the transistor Tc from its drain electrode. Consequently, the boosted voltage $V_{Nb}$ applied to the node Nb takes a value obtained by adding a voltage boost caused by the capacitor Cb to the voltage pulled into the node Nd from the source electrode of the transistor Tc. In sum, the boosted voltage $V_{Nb}$ applied to the node Nb can be expressed as $$V_{Nb}=\min(V_{OUT}+2*V_{DD}-3*V_{th},V_{OUT})+V_{DD} \qquad \text{Equation 4.}$$

As shown by Equation 4, a voltage boosted by the gate voltage boosting circuit 2b' from the output voltage $V_{OUT}$ is applied to the node Nb, or the gate electrode of the switching transistor Tb. Accordingly, a higher voltage depending on the voltage applied to the node Nb is applied to the gate electrode (the node Na) of the transfer gate transistor Ta as well.

In the present embodiment, as described above, the transistors Tc and Td in the gate voltage boosting circuit 2b' each have a feature of controlling a voltage outputted to the source electrode by constantly comparing a voltage applied to the gate electrode with the output voltage $V_{OUT}$.

The feature provides the following advantage to the booster circuit designed to apply, to the node Na, such a high voltage that can turn on the transfer gate transistor Ta even under conditions in which the power supply voltage $V_{DD}$ is low, the temperature is low, and the thresholds of the respective transistors used in the circuit are high. Specifically, the above-described feature enables the booster circuit to prevent an excessively high voltage from being applied to the gate electrodes respectively of the switching transistor Tb and the transfer gate transistor Ta when the booster circuit operates under conditions in which the power supply voltage $V_{DD}$ is high, the temperature is high, and the thresholds of the respective transistors used in the circuit are low. Accordingly, the booster circuit is capable of preventing malfunction and junction leakage in the transfer gate transistor Ta and the switching transistor Tb.

In the present embodiment, the two booster transistors Tc and Td are provided in the gate voltage boosting circuit 2b'. However, the gate voltage boosting circuit 2b' may be provided with only the booster transistor Tc, or three or more booster transistors. When only the booster transistor Tc is provided, neither the transistor Tb nor the capacitor Cd is necessary any longer. Furthermore, when additional booster transistors are provided, booster capacitors need to be additionally provided in the gate voltage boosting circuit 2b'. Note that connection between each added pair of a transistor and a capacitor is the same as that between the transistor Td and the capacitor Cd.

The booster circuit according to the present invention can be used for an MEMS variable capacitor system. For example, the booster circuit can be used as a booster circuit provided in a driver IC for generating and supplying a voltage needed to reduce the distance between driving electrodes in a MEMS, or to keep the distance constant. Furthermore, the booster circuit is applicable to various generally-used booster circuits, each of which needs a voltage higher than the power supply voltage.

While the invention is subject to various modifications and alternative forms, specific embodiments thereof are shown by way of embodiments in the drawings and the accompanying detailed description. It should be understood that the drawings and detailed description are not intended to limit the invention to the particular embodiments which are described. This disclosure is instead intended to cover all modifications, equivalents and alternatives falling within the scope of the present invention as defined by the appended claims.

What is claimed is:

1. A booster circuit comprising:
a first booster unit configured to boost a power supply voltage to a predetermined voltage value;
an input terminal receiving a voltage from the first booster unit;
a transfer gate transistor transferring the voltage received from the first booster unit to a first output terminal;
a switching transistor connected between the input terminal and a gate electrode of the transfer gate transistor; and
a second booster unit configured to boost a voltage applied to a gate electrode of the switching transistor, wherein
the second booster unit includes a booster transistor,
a drain electrode of the booster transistor is connected to the first output terminal,
a source electrode of the booster transistor is connected to the gate electrode of the switching transistor, and
a gate electrode of the booster transistor is connected to a booster capacitor.

2. The booster circuit according to claim 1, wherein
the booster transistor includes a plurality of booster transistors,
a source electrode of one of the plurality of booster transistors is connected to the gate electrode of the switching transistor, and
source electrodes of other of the plurality of booster transistors are connected to a gate electrode of another one of the plurality of booster transistors.

3. The booster circuit according to claim 1, wherein
a threshold voltage of the transfer gate transistor is higher than a threshold voltage of the switching transistor and a threshold voltage of the booster transistor.

4. The booster circuit according to claim 1, wherein
the output terminal is connected to a limiter circuit configured to control a voltage on the first output terminal to a constant value.

5. The booster circuit according to claim 1, wherein the booster transistor is an NMOS transistor.

6. The booster circuit according to claim 1, wherein the booster transistor has a first booster transistor and a second booster transistor, a gate electrode and a drain electrode of the first booster transistor are connected to the first output terminal, a source electrode of the first booster transistor is connected to a gate electrode and a drain electrode of the second booster transistor, and a source electrode of the second booster transistor is connected to the gate electrode of the switching transistor.

7. The booster circuit according to claim 1, further comprising a first capacitor and a second capacitor, wherein the first capacitor is connected to the gate electrode of the transfer gate transistor, the second capacitor is connected to the gate electrode of the switching transistor.

8. The booster circuit according to claim 1, wherein the first booster unit includes an first NMOS transfer gate transistor, an second NMOS transfer gate transistor, a first NMOS switching transistor, an second NMOS switching transistor, a first capacitor for boosting a voltage applied to a gate electrode of the first NMOS transfer gate transistor, a second capacitor for boosting the power supply voltage, a third capacitor for boosting a voltage applied to a gate electrode of the second NMOS transfer gate transistor, and a fourth capacitor for boosting the power supply voltage,
the first NMOS transfer gate transistor and the second NMOS transfer gate transistor are connected between the power supply voltage and a second output terminal in series,
the first NMOS switching transistor is connected between the power supply voltage and a gate electrode of the first NMOS transfer gate transistor,
the second NMOS switching transistor is connected between a drain terminal of the first NMOS transfer gate transistor and a gate electrode of the second NMOS transfer gate transistor,
the first capacitor is connected to the gate electrode of the first NMOS transfer gate transistor,
the second capacitor is connected to the drain electrode of the first NMOS transfer gate transistor,
the third capacitor is connected to the gate electrode of the second NMOS transfer gate transistor, and
the fourth capacitor is connected to the drain electrode of the second NMOS transfer gate transistor.

9. The booster circuit according to claim 1, wherein the booster transistor has a first booster transistor, a second booster transistor and a third booster transistor, drain electrodes of the first, second and third booster transistors are connected to the first output terminal, a source electrode of the first booster transistor is connected to a gate electrode of the switching transistor, a gate electrode of the first booster transistor is connected to a source electrode of the second booster transistor, a gate electrode of the second booster transistor is connected to a source electrode of the third booster transistor, and a gate electrode of the third booster transistor is connected to the first output terminal.

10. The booster circuit according to claim 1, wherein a first signal is inputted into the transfer transistor and the booster transistor, and a second signal is inputted into the switching gate transistor.

11. A semiconductor device comprising:
a booster circuit that boosts a power supply voltage to provide a predetermined voltage; and
a limiter circuit for controlling a voltage received from the booster circuit, wherein
the booster circuit includes:
a first booster unit that boosts a power supply voltage to a predetermined voltage;
an input terminal for receiving a voltage output by the first booster unit;
a transfer gate transistor that transfers the voltage received from the first booster unit to a first output terminal;
a switching transistor connected between the input terminal and a gate electrode of the transfer gate transistor; and
a second booster unit that boosts a voltage applied to a gate electrode of the switching transistor, the second booster unit including a booster transistor having a drain electrode connected to the first output terminal, a source electrode connected to gate electrode of the switching transistor, and a gate electrode connected to a booster capacitor.

12. The semiconductor device according to claim 11, wherein
the booster transistor includes a plurality of booster transistors,
a source electrode of one of the plurality of booster transistors is connected to the gate electrode of the switching transistor, and
source electrodes of other of the plurality of booster transistors are connected to a gate electrode of another one of the plurality of booster transistors.

13. The semiconductor device according to claim 11, wherein
a threshold voltage of the transfer gate transistor is higher than a threshold voltage of the switching transistor and a threshold voltage of the booster transistor.

14. The semiconductor device according to claim 11, wherein the booster transistor is an NMOS transistor.

15. The semiconductor device according to claim 11, wherein the booster transistor has a first booster transistor and a second booster transistor, a gate electrode and a drain electrode of the first booster transistor is connected to the first output terminal, a source electrode of the first booster transistor is connected to a gate electrode and a drain electrode of the second booster transistor, and a source electrode of the second booster transistor is connected to the gate electrode of the switching transistor.

16. The semiconductor device according to claim 11, further comprising a first capacitor and a second capacitor, wherein the first capacitor is connected to the gate electrode of the transfer gate transistor, the second capacitor is connected to the gate electrode of the switching transistor.

17. The semiconductor device according to claim 11, wherein the first booster unit includes an first NMOS transfer gate transistor, an second NMOS transfer gate transistor, a first NMOS switching transistor, an second NMOS switching transistor, a first capacitor for boosting a voltage applied to a gate electrode of the first NMOS transfer gate transistor, a second capacitor for boosting the power supply voltage, a third capacitor for boosting a voltage applied to a gate electrode of the first NMOS transfer gate transistor, and a fourth capacitor for boosting the power supply voltage,
the first NMOS transfer gate transistor and the second NMOS transfer gate transistor are connected between the power supply voltage and a second output terminal in series,
the first NMOS switching transistor is connected between the power supply voltage and a gate electrode of the first NMOS transfer gate transistor,
the second NMOS switching transistor is connected between a drain electrode of the first NMOS transfer gate transistor and a gate electrode of the second NMOS transfer gate transistor,
the first capacitor is connected to the gate electrode of the first NMOS transfer gate transistor,
the second capacitor is connected to the drain electrode of the first NMOS transfer gate transistor,
the third capacitor is connected to the gate electrode of the second NMOS transfer gate transistor, and
the fourth capacitor is connected to the drain electrode of the second NMOS transfer gate transistor.

18. The semiconductor device according to claim 11, wherein the booster transistor has a first booster transistor, a second booster transistor and a third booster transistor, drain electrodes of the first, second and third booster transistor are connected to the first output terminal, a source electrode of the first booster transistor is connected to the gate electrode of the switching transistor, a gate electrode of the first booster transistor is connected to a source electrode of the second booster transistor, a gate electrode of the second booster transistor is connected to a source electrode of the third booster transistor, and a gate electrode of the third booster transistor is connected to the first output terminal.

19. The semiconductor device according to claim 11, wherein a first signal is inputted into the transfer transistor and the booster transistor, and a second signal is inputted into the switching gate transistor.

20. The semiconductor device according to claim 18,
wherein a first signal is inputted into the transfer transistor and the first booster transistor, and a second signal is inputted into the switching gate transistor and the second booster transistor.

* * * * *